United States Patent [19]
Pradhan et al.

[11] Patent Number: 5,866,501
[45] Date of Patent: Feb. 2, 1999

[54] DISPERSED ANION-MODIFIED IRON OXIDE CATALYSTS FOR HYDROCONVERSION PROCESSES

[76] Inventors: Vivek R. Pradhan, Princeton Arms, North #1, Apt. 75, Cranbury, N.J. 08512; Alfred G. Comolli, 1128 University Ave., Yardley, Pa. 19067; Lap-Keung Lee, 12 East Kincaid Dr., Cranbury, N.J. 08512

[21] Appl. No.: 609,759

[22] Filed: Feb. 23, 1996

[51] Int. Cl.⁶ .......................... B01J 23/74; B01J 23/745; B01J 27/043; C10G 1/06
[52] U.S. Cl. .......................... 502/338; 502/213; 502/217; 502/221; 502/222; 502/305; 502/337; 208/143; 208/419
[58] Field of Search ...................... 502/338, 325, 502/217, 213, 221, 222, 337, 305; 208/413, 419, 13, 143

[56] References Cited

U.S. PATENT DOCUMENTS

| | | | |
|---|---|---|---|
| 3,972,829 | 8/1976 | Michalko | 252/430 |
| 4,895,821 | 1/1990 | Kainer et al. | 502/204 |

*Primary Examiner*—Michael Lewis
*Assistant Examiner*—Alexander G. Ghyka
*Attorney, Agent, or Firm*—Fred A. Wilson

[57] ABSTRACT

A dispersed fine-sized anion-modified iron oxide slurry catalyst having high surface area exceeding about 100 m²/gm and high catalytic activity, and which is useful for hydrogenation and hydroconversion reactions for carbonaceous feed materials is disclosed. The catalyst is synthesized by rapid aqueous precipitation from saturated salt solutions such as ferric alum or ferric sulfate, and is promoted with at least one active metal such as cobalt, molybdenum, nickel, tungsten and combinations thereof. The iron-based dispersed catalysts are modified during their preparation with anionic modifiers such as molybdate ($MoO_4^{2-}$), phosphate ($PO_4^{3-}$), sulfate ($SO_4^{2-}$), or tungstate ($WO_4^{2-}$). The resulting catalyst usually has primary particle size smaller than about 50 Angstrom units, and may be used in the form of a gel or wet cake which can be easily mixed with a hydrocarbonaceous feed material such as coal, heavy petroleum fractions, mixed waste plastics or mixtures thereof. Alternatively, the catalyst can be dried and/or calcined so as to be in a fine dry particulate form suitable for adding to the feed material. The invention includes methods for making the catalyst and processes for using the catalyst for hydroprocessing of the carbonaceous feed materials.

19 Claims, 4 Drawing Sheets

HYDROCONVERSION OF CARBONACEOUS FEEDS USING AN ALL-DISPERSED SLURRY CATALYST REACTOR SYSTEM

FIG. 1

HYDROCONVERSION OF CARBONACEOUS FEEDS USING AN ALL-DISPERSED SLURRY CATALYST REACTOR SYSTEM

FIG. 2 HYDROCONVERSION OF CARBONACEOUS FEEDS USING A HYBRID CATALYST REACTOR SYSTEM

DISPERSED ANION-MODIFIED IRON OXIDE CATALYSTS FOR HYDROCONVERSION PROCESSES

BACKGROUND OF INVENTION

This invention pertains to highly dispersed anion-modified iron oxide slurry catalysts, having high surface area and high catalytic activity for hydroconversion reactions. It pertains particularly to such dispersed iron oxide catalysts which are synthesized by rapid precipitation from saturated aqueous solutions of iron salts in presence of selected anions, including molybdate ($MoO_4^{2-}$), phosphate ($PO_4^{3-}$), sulfate ($SO_4^{2-}$) or tungstate ($WO_4^{2-}$), and are promoted by the addition of small amounts of an active hydrogenation metal including cobalt, molybdenum, nickel, and tungsten. Such dispersed catalysts are useful for hydroconversion of carbonaceous feed materials such as coal, heavy petroleum resids, and other high molecular weight hydrocarbons such as waste plastics to produce desirable value-added low-boiling hydrocarbon liquid products.

The use of various iron containing compounds such as pyrites ($FeS_2$) and red mud ($Fe_2O_3$) as catalysts for coal hydrogenation and liquefaction processes has been well known for many years. Such particulate iron compounds were usually added in small amounts to a coal-oil slurry feedstream upstream of a catalytic reactor operated at elevated temperature and pressure conditions. However, because of the generally low effectiveness of such known catalysts primarily due to their low initial surface areas and inability to provide high levels of dispersion (number of catalyst particles per unit reacting volume, a direct measure of how finely divided the catalyst is) under reaction conditions, catalytic hydroconversion processes for coal and heavy petroleum feedstocks which have been developed during the past 30 years have usually utilized particulate (extrudate) supported type catalysts having small amounts of one or more active promotor metals such as cobalt, molybdenum or nickel deposited on an inert support material such as alumina or silica. Some examples of such extrudate supported catalysts are disclosed by U.S. Pat. No. 3,630,888 to Alpert et al, U.S. Pat. No. 4,294,685 to Kim et al.; and U.S. Pat. No. 4,424,109 to Huibers et al. Such extrudate supported catalysts are used in either downflow fixed bed reactors or in upflow ebullated bed reactors each maintained at desired conditions of temperature, pressure and space velocity.

Although such particulate extrudate supported type catalysts such as cobalt-molybdenum or nickel-molybdenum deposited on alumina or silica support and catalytic hydroconversion processes using the supported catalysts have provided good results for hydrogenation and hydroconversion of coal and heavy oil feed materials, some disadvantages of such particulate supported type catalysts are their relatively poor contact with the feed materials primarily due to the pore-diffusional limitations and rapid deactivation caused by deposition on the catalyst of coke and metal contaminants such as iron, nickel, and vanadium contained in the feeds. U.S. Pat. No. 4,136,013 to Moll et al. discloses an emulsion-type metal catalyst useful for hydrogenation processes, but it also has disadvantages of low catalytic activity and high catalyst usage. At the levels of catalyst usage disclosed in the Moll et al. patent, the catalyst cost becomes prohibitive unless the catalyst is recovered from the unconverted material and reused. U.S. Pat. Nos. 4,134,825 and 4,077,867 to Bearden et al. disclose an in-situ formed metal-carbon containing dispersed slurry catalyst, called 'M-Coke' for hydroconversion of coal, heavy oil, and mixtures thereof. These catalysts of Bearden et al. are primarily based on molybdenum which is significantly more expensive than iron and which is the principal component of the catalyst of the present invention. Also, disposal of used molybdenum catalyst is not environmenatlly as benign as that of an used iron catalyst. U.S. Pat. No. 4,486,293 to D. Garg disclosed a co-catalyst combination of iron and Group VI or VIII non-ferrous metal for liquefaction of coal in a hydrogen-donor solvent using water soluble salts of the co-catalyst metals. It is known that catalysts formed from the water-soluble precursor salts often undergo sintering under coal liquefaction conditions and lack a high degree of dispersion necessary for high catalytic activity. U.S. Pat. No. 5,168,088 to Utz et al. discloses a unique way of improving the slurry catalyst dispersion during coal liquefaction by precipitating the iron oxide onto coal matrix. But it is believed that deposition by such precipitation of the entire coal feed with catalyst would present various operational problems and would also be very expensive at the commercial scale of operation.

V. Pradhan et al. disclosed in "Catalysis in Direct Coal Liquefaction by Sulfated Metal Oxides" Energy and Fuels, 1991, Vol. 5, various dispersed catalysts which have been found useful in coal liquefaction processes, including sulfated transition metal oxides such as sulfated iron oxides ($Fe_2 O_3/SO_4$) and sulfated tin oxides ($Sn O_2/SO_4$) wherein the role of added anion ($SO_4^{2-}$) was attributed to the prevention of catalyst sintering or agglomeration under coal liquefaction conditions. However, further improvements are desired in catalyst forms and compositions used for hydroprocessing of various hydrocarbon feedstocks, and in the catalytic hydroconversion processes in which the catalysts are used, particularly for dispersed catalysts that are less expensive, environmentally benign, and highly active for the hydrocarbon hydroconversion processes in which they are used.

SUMMARY OF INVENTION

This invention provides highly dispersed and fine-sized slurry type iron oxide-based catalysts which have high surface area and high catalytic activity for hydrogenation and hydrocracking of carbonaceous feedstocks. The catalysts are formed of oxides and/or oxyhydroxides of iron, precipitated in the presence of an anion such as molybdate ($MoO_4^{2-}$), phosphate ($PO_4^{3-}$), sulfate ($SO_4^{2-}$) or tungstage ($WO_4^{2-}$) and are synthesized by rapid aqueous precipitation from saturated salt solutions to produce the fine-sized particles having high surface area of 100–250 $m^2/g$ after drying, and are also promoted by addition of at least one active hydrogenation stabilization metal including small concentrations of cobalt, molybdenum, nickel, or tungsten and combinations thereof. The aqueous precipitation of the primary iron oxide from saturated solutions is conducted rapidly in the presence of the source of molybdate ($MoO_4^{2-}$), phosphate ($PO_4^{2-}$), sulfate ($SO_4^{2-}$) or tungstate ($WO_4^{2-}$) anions in the solution to produce fine-sized precipitates having high surface area. The broad useful concentration of iron in the final catalyst is 5–60 w % and the concentration of anions in the final catalyst is in the range of 0.5–10 w %. The concentration of the active promotor metals is provided in useful ranges of 0.05–2 wt % of cobalt, molybdenum, nickel, tungsten or combinations thereof with the remainder being water. If the dry powdered form of the final catalyst is desired, the catalyst precipitates may be filtered, dried at 100°–120° C., and/or calcined at high temperature of 450°–550° C., and usually have primary particle size smaller than about 50 Angstrom units and secondary particle size of 1–20 microns. The resulting fine-sized catalysts preferably have high surface area of 140–200 m$^2$/g after drying. Alternatively, the catalyst precipitates may be advantageously used in a gel or a wet-cake form without removing any water retained in it from the precipitation step.

The fine-sized dispersed catalysts compositions according to this invention are useful in slurry phase hydroprocessing reactions such as for hydroconversion of carbonaceous feed materials including coal, heavy petroleum resids, lignin, waste plastics materials, and mixtures thereof to produce desirable low-boiling value-added premium hydrocarbon distillate liquid products. Due to the high activity of these dispersed iron-based catalysts, they can be used in small concentrations of 0.1–1.0 wt % iron relative to weight of feed for the various hydrogenation and hydroconversion reactions mentioned above, and the catalysts are preferably recycled with the unconverted or partially converted high boiling fraction (454° C.+) back to the reactor for further reaction. Because these dispersed fine-sized iron oxide catalysts are produced based on use of available relatively inexpensive materials and since the principal component is cheap and environmentally friendly iron, they are usually disposable for large scale processes and do not require recovery and regeneration.

This invention advantageously provides dispersed fine-sized iron oxide-based catalysts having high surface area and high catalytic activity. The catalysts are easily produced, inexpensive and are useful as an expendable slurry type catalyst in processes for catalytic hydrogenation and hydroconversion of carbonaceous materials such as coal, heavy petroleum, waste plastics, etc. and mixtures thereof to produce desirable low boiling hydrocarbon liquid and gaseous products. The invention also includes methods for making the catalysts and hydroconversion processes for hydrocarbonaceous feed materials utilizing the dispersed catalysts.

DESCRIPTION OF INVENTION

The dispersed catalysts compositions according to this invention include oxides and/or oxyhydroxides of iron, combined with the anions such as molybdate ($MoO_4^{2-}$), phosphate ($PO_4^{3-}$), sulfate ($SO_4^{2-}$), or tungstate ($WO_4^{2-}$), and are promoted by the addition of small amounts of an active hydrogenation metal such as cobalt, molybdenum, nickel, or tungsten and combinations thereof in the form of fine-sized precipitates. The catalyst precipitates have secondary particle size of 1–20 microns and surface area of 100–250 m$^2$/g after drying. The catalyst broad compositions include 5–60 wt. % iron, 0.5–10 wt % anion, and 0.05–2 wt % hydrogenation promotor metal, with the remainder being water. Preferred catalyst compositions include 10–50 wt % iron, 1–5 wt % sulfate ($SO_4$) anion, and 0.1–1.0 wt % active promotor metal. The catalyst can be produced and used either as a wet cake consisting of a gel of precipitated particles in water containing 50–80 wt % water, or as a dry powder obtained after drying and/or calcination of the oxyhydroxide precipitates. In the preferred catalyst gel mode of usage, the precipitates from hydrolysis are not filtered or dried, but are used as is. The catalyst gel form reduces the catalyst cost significantly and also does not compromise at all on its activity for relevant hydroprocessing reactions.

The dispersed iron oxide slurry catalysts of this invention are cost-effective and environmentally benign because the principal component is iron. These catalysts have been shown to be very effective for hydroconversion of high molecular weight hydrocarbons including fossil fuels such as coals and heavy petroleum residua, and organic waste materials such as co-mingled plastics from municipal solid wastes, and mixtures thereof. The catalysts of this invention, either in the dry powder form or in the gel or wet-cake form, have been successfully tested both at a 20 cc microautoclave reactor scale and at a 30 kg/day continuous two-stage bench-scale operation, under hydrogen pressures of 5–20 MPa and operating temperatures of between 400° to 460° C. The dispersed iron catalysts have been utilized in small loadings relative to feed (0.1 to 1.0 wt %) so that they can be used on a once-through basis in commercial hydroconversion operations. Using the dispersed slurry catalysts of this invention alone, and also with other co-catalysts, excellent process performance in terms of carbonaceous feed conversion to liquid and gaseous products, light distillate yields, and hydrogen consumption have been obtained during the hydroprocessing of different types of feed materials including coal, heavy petroleum resid, municipal solid waste plastics, and lignin. The catalyst is useful for broad operating conditions of reactor temperatures in the range of 400°–460° C., hydrogen partial pressures between 5–20 MPa, and feed space velocities between 320–1280 kg/h/m$^3$ reactor volume. The loadings of dispersed catalysts are such that about 500–10000 ppm of iron and about 25–200 ppm of molybdenum are provided by weight relative to the feed. Under these conditions, using a two-stage back-mixed reactor configuration, feed conversions of 93–99 wt % and over have been obtained with 60–77 wt % yield of light distillate liquid. The dispersed slurry catalysts of the present invention have been successfully tested both at the microreactor level and the 30 kg/day continuous bench-scale of operation for hydroconversion of coals, especially of low rank, heavy residua, waste plastics, and mixtures thereof. Typically, in two reactor-stage configuration, with or without an interstage product separator, feed conversions of over 95 wt % have been obtained with yields of over 75 wt % of light distillable liquid products.

The dispersed catalysts of this invention are also highly versatile for hydroprocessing of high molecular weight carbonaceous materials besides coal, such as heavy petroleum resid, mixed plastics from municipal solid wastes, biomass, and lignin. The key reasons for the higher activity of the catalysts of this invention as compared with some other iron-based catalysts disclosed in literature, is their initial fine size, high surface area, a high extent of catalytic dispersion, and their ability to preserve the state of high dispersion under reaction conditions due to presence of anionic modifiers which are known to prevent sintering or agglomeration of fine-sized particles at high temperatures.

CATALYST PREPARATION METHODS

The dispersed fine-sized iron oxide catalyst according to this invention can be prepared using either of two methods. For Method I preparation, ferric ammonium sulfate (also known as iron (III) alum), $Fe_2(SO_4)_3.(NH_4)_2SO_4.24H_2O$, is used as the starting material. The catalyst is prepared by starting with 100 g of iron (III) alum dissolved in 100–150 cc water, and adding 20–28 w % ammonium hydroxide at 10–20 cc/min rate so as to produce precipitate particles (by hydrolysis of the starting iron salt) to form FeOOH/SO$_4$ at a final pH of 7.5–8.5. The precipitate particles are washed and can be, filtered, and dried at about 100°–120° C. for 20–24 hours. The resulting dried iron oxide sulfate catalyst can also be calcined further at about 450°–550° C. for 2–4 hours if one desires to increase hydrocracking activity of the catalyst at the expense of its hydrogenation activity. Ammonium molybdate, as a source of molybdenum promoter, is added to dried catalyst by incipient wetness impregnation to produce Mo/FeOOH/SO$_4$ catalyst after drying.

The Method I catalyst can be utilized in various hydroconversion processes in the form of either a gel or wet moisture-containing cake obtained from the rapid precipitation of particles (before precipitate particles are filtered or dried), or as a dried fine-sized, moisture-free powder. For the final catalyst made in the gel or wet-cake form, the hydrolysis reaction brought about by the addition of ammonium hydroxide to the iron salt is stopped at a pH of about 4.0–5.0. This Method I catalyst can be advantageously used in either of the wet cake or dry powder forms for hydroliquefaction of bituminous and sub-bituminous coal to produce desired hydrocarbon liquid products, and has been shown to have similar positive results of the catalytic activity on process performance regardless of which form of the catalyst is used. Thus, the use of 20–50 wt % solids—containing catalyst filter cake becomes even more economical than the dried particulate catalyst for various hydroconversion reactions, as the dispersed catalysts of this type are used at low concentration or loading relative to the coal feed, and any moisture contained in the catalyst is not detrimental to the reaction process. In the dried form, the Method I slurry catalyst contains at least about 30–60 wt. % iron and preferably about 40–55 wt % iron. When the Method I catalyst is promoted with small amounts of a hydrogenation promotor metal such as molybdenum, metal concentration will be about 0.5–2 wt. % Mo and the sulfate (SO$_4$) anion content is 2–6 wt. %. The BET surface area is between 140–200 m$^2$/g.

For Method II preparation the catalyst uses 100 g of ferric sulfate pentahydrate Fe$_2$(SO$_4$)$_3$.5H$_2$O as a starting material, to which 0.43 g of ammonium heptamolybdate (NH$_4$)$_6$Mo$_7$O$_{24}$.4H$_2$O is added and dissolved in 100–150 cc water. Then about 60–70 cc of 20–28 w % ammonium hydroxide (NH$_4$OH) is added at the rate of 10–20 cc/min to produce rapid precipitation until a dark brown gel is formed at a pH of about 4.0–5.0, which contains 20–50 wt. % solids which are mostly Fe(OH)$_3$ and some FeOOH with sulfate anion impurities and unhydrolyzed iron salts. The gel, so formed, can be used in the hydroconversion reactions without further drying or purification. The gel or wet cake resulting from Method II preparation contains about 0.5–2.0 wt % anion and about 0.05–0.5 wt % promoter metal.

Whenever used in the gel or wet-cake form, the dispersed catalysts prepared by either Methods I or II need to be premixed with an oil (recycle solvent in coal liquefaction) with agitation at temperatures lower than the boiling point of water and mixed with the hydrocarbon feedstream. In the dried powered form, the catalysts can be simply added to the feed mixing tank and provided with some suitable means of agitation.

PROCESSES UTILIZING DISPERSED IRON OXIDE CATALYSTS

The dispersed iron oxide slurry catalysts of this invention can be advantageously used in processes for catalytic hydroconversion of various high molecular weight hydrocarbon feed materials, including coal, petroleum residua, plastic wastes, and mixtures thereof to produce desired lower-boiling hydrocarbon liquid and gaseous products, which include transportation and utility fuels such as gasoline, diesel, kerosine, fuel oil, and petrochemicals. The catalyst of this invention, in either the gel form or the dried particulate form, can be added to the hydrocarbon feedstream or it can be injected directly into the reactor along with a premixed oil at elevated temperature and pressure conditions.

Figure 1:
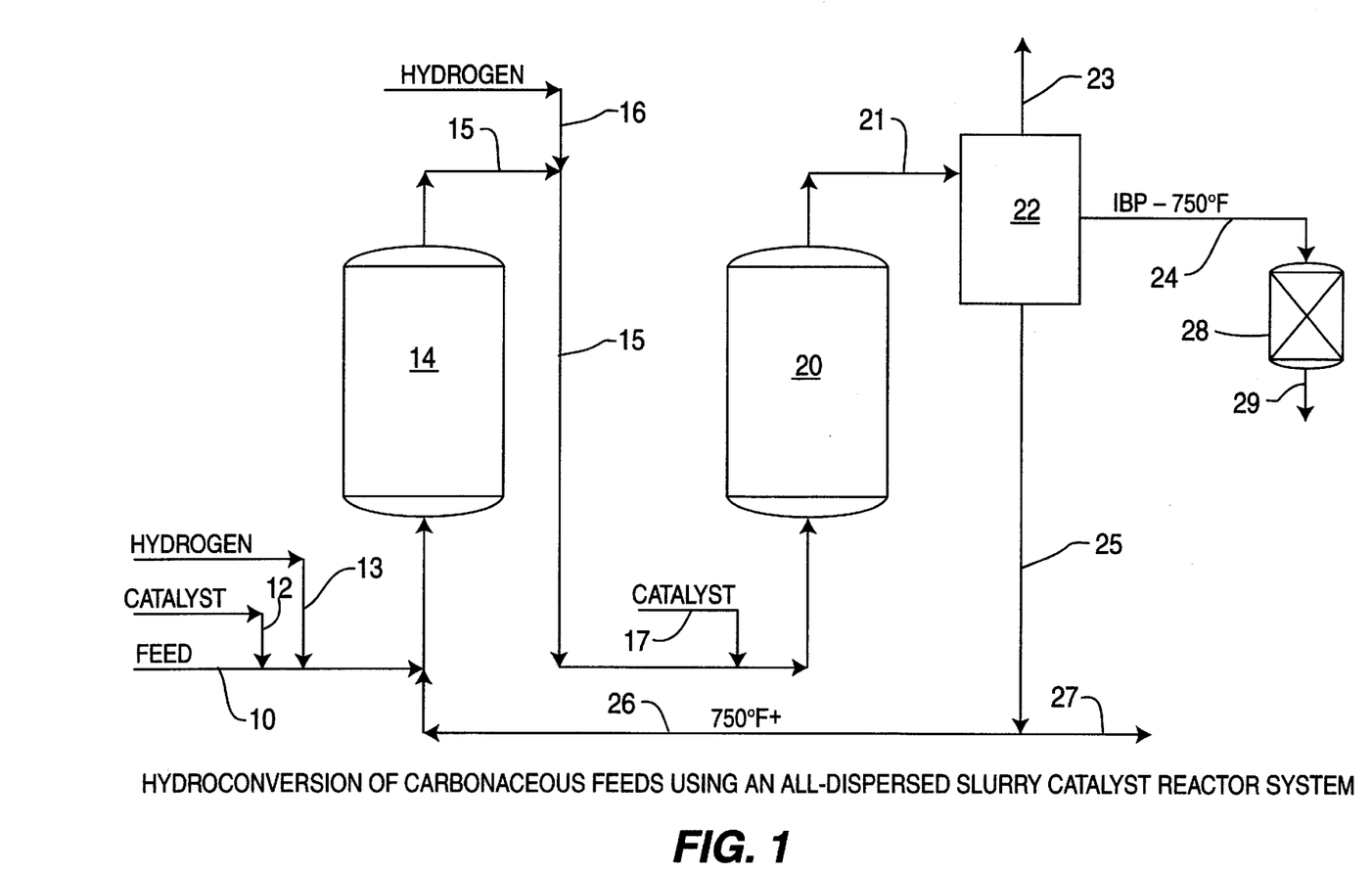
FIG. 1 is a schematic flow diagram of a close-coupled catalytic two-stage hydroconversion process utilizing dispersed iron-based catalysts of this invention in both reactor stages.
Figure 2:
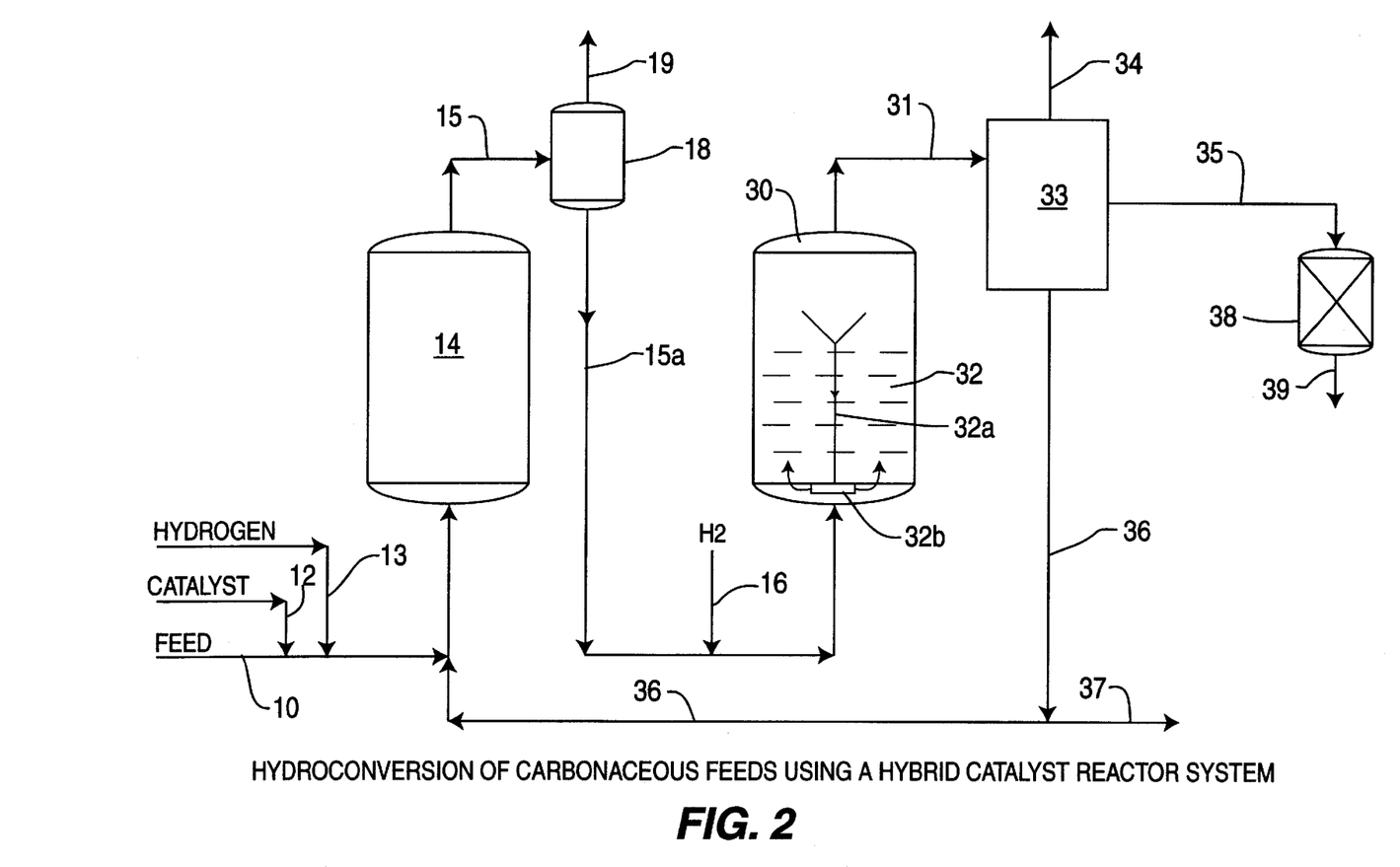
FIG. 2 is similar to FIG. 1 but is a hybrid system which utilizes a dispersed iron-based catalyst in the first stage reactor and a supported extrudate type of catalyst in the second stage reactor.

Catalytic hydroconversion processes utilizing the catalysts of this invention can be performed in a single-stage reactor, but preferably utilize two hydroconversion reactors connected in series, either close-coupled or with an interstage separator, so that different reaction conditions can be maintained in each reactor as may be desirable for achieving best hydroconversion results on a particular hydrocarbon feed material. Both reactors can contain only dispersed slurry catalyst as shown in FIG. 1. Alternatively, the catalyst can be utilized in a hybrid mode in which one of the reactors, preferably the second stage reactor, will contain an expanded catalyst bed with a supported catalyst such as CoMo or NiMo on alumina extrudates as shown in FIG. 2. Both the hydroconversion reactors are operated in a back-mixed mode. The reactor liquid and catalyst slurry can be recycled in the reactor if desired to maintain adequate mixing.

The reactor final effluent stream is phase separated into vapor and liquid fractions, and the liquid fraction is distilled to produce various desired lower-boiling hydrocarbon distillate liquid products. The distillation bottom heavy liquid residue containing most of the catalyst is usually recycled back to the first stage reactor for further hydroconversion reactions therein.

As shown in FIG. 1, a hydrocarbon feed material at 10 is pressurized and fed together with the catalyst at 12 and hydrogen at 13 upwardly into the first stage reactor 14, where the reacting material is back-mixed and circulated providing a CSTR action. Partially reacted material removed from first stage reactor at 15 has additional hydrogen added at 16 and catalyst added at 17, and is passed into a second stage back-mixed reactor 20 for further reactions. An effluent stream is withdrawn at 21 and further processed in a series of high and low pressure gas-liquid separators and distillation steps in section 22. A product gas stream including light hydrocarbon gases C$_1$–C$_3$ together with H$_2$, CO, CO$_2$, NH$_3$, and H$_2$S is withdrawn at 23, and the hydrogen is purified and recycled back to the first stage reactor at 13 along with make-up H$_2$ as needed. Hydrocarbon liquid product with a typical boiling range of 80°–750° F. is withdrawn at 24, and heavier liquid or slurry product stream 25 which may contain some dispersed catalyst is recycled at 26 back to the first stage reactor 14, after part of the refractory product and any solids are removed by stream 27. An in-line catalytic fixed-bed hydrotreater 28 may be provided for improving the quality of the light distillates in stream 24.

An alternative catalytic two-stage hydroconversion process is shown in FIG. 2. This process is very similar to that shown in FIG. 1 in that the first stage reactor 14 utilizes the dispersed catalyst of this invention. However, the first stage reactor effluent 15 is passed to an interstage gas-liquid high pressure separator 18 from which a vapor fraction 19 is removed and a liquid/slurry fraction 15a is passed with hydrogen at 16 to the second stage reactor 30, which contains an expanded bed 32 of a conventional supported extrudate catalyst. The fine sized dispersed catalyst contained in the effluent stream 15a from the first stage reactor 14 passes through the expanded particulate catalyst bed 32 in the second stage reactor 30. The effluent stream 31 from the second stage reactor is passed to a product separation section 33 which is operated similarly as for the gas-liquid separation section 22 for the FIG. 1 process. The gas separation, heavy liquid/slurry product recycle and solids separation are handled in the similar manner as in FIG. 1 process. For both the processes shown in FIGS. 1 and 2, the light liquid product (80°–750° F.), which is the net process distillate product at 35 may be passed through an in-line fixed-bed hydrotreating reactor 38 so that the resulting distillate products have high hydrogen contents and low heteroatom (N, S, O) contents.

The dispersed iron oxide catalysts of this invention can also be advantageously used for hydroconversion of petroleum residua feedstocks, and also for cracking of high molecular weight polymeric feed materials, such as waste plastics from municipal solid waste streams including polyethylene, polypropylene, and polystyrene either alone in a co-mingled state, or mixed with coal and/or heavy oil. Useful reaction conditions for such petroleum residua hydroconversion reactions are 425°–450° C. temperature and 7–17 MPa hydrogen partial pressure. Useful reaction conditions for cracking plastic wastes are similar to those for hydrocking of coal and heavy petroleum residua.

The dispersed catalysts of this invention have been utilized in continuous bench-scale operations in the processes of direct coal liquefaction, coal/oil coprocessing, coal/waste plastics coprocessing, heavy oil upgrading, oil/waste plastics coprocessing, and coal/oil/waste plastics coprocessing. Under the operating conditions mentioned above, significant process performance improvements have been obtained not only for increased distillate yields and residuum conversion, but the process is less complex operationally because a supported catalyst ebullated bed reactor is replaced by a simple back-mixed slurry catalyst reactor. The use of dispersed catalyst also allows better utilization of the reactor space for the reacting material, and as a result the overall throughput of the process can be improved by as much as 50%.

This invention will be described further with the aid of the following Examples, which should not be construed as limiting in scope.

EXAMPLE 1

The properties of two anion-modified iron oxide catalysts of this invention, prepared by Methods I and II, as compared with two commercially available iron oxide materials are provided in Table 1 below.

TABLE 1

Iron Oxide Catalyst Comparisons

| Catalyst | Sulfate, wt. % | Mo wt. % | BET Surface Area, $m^2/g$ |
|---|---|---|---|
| Aldrich $Fe_2O_3$ | 0 | 0 | 10.1 |
| Mach-I $Fe_2O_3$ | 0 | 0 | 260 |
| FeOOH/$SO_4$ (Method I) | 9.6 | 0 | 191 |
| Mo/FeOOH/$SO_4$ (Method I) | 8.4 | 1.3 | 188 |
| Mo/FeOOH/$SO_4$ (Method II) | 6.2 | 1.1 | 183 |

As shown in Table 1, the dried particulate forms of iron-molybdenum dispersed slurry catalysts prepared by Methods I and II had sulfate anion modifier contents in a range of 6.2 to 9.6 wt % and molybdenum contents of about 1 wt %. It is seen from Table 1 that the surface areas of the sulfate-modified iron catalysts are more than an order of magnitude greater than the Aldrich ferric oxide. Another commercially available Mach I iron oxide catalyst included in Table 1 does not have sulfate anion modification, but has a higher initial surface area (260 $m^2/g$) than the sulfated catalysts. The Mach I catalyst is intentionally included in the comparison shown in Table 1 because after observing the reactivity data from Table 2 below, it is seen that even though this commercial Mach I iron oxide catalyst had a higher initial surface area, it resulted in lower coal and residuum conversions in microautoclave reactions on coal. This result suggests that in the absence of any anionic modifiers, the commercial high surface area iron oxide undergoes sintering and agglomeration under coal liquefaction conditions, and loses its 'initially high' catalytically effective surface area. It is noted that the dried particulate forms of Method I and Method II sulfated iron oxide catalysts had surface areas in the range of 140–200 $m^2/g$.

A comparison of catalytic activity for hydroconversion reactions on coal with both the wet cake and dried particle forms of the Methods I and II catalysts was made with the two commercial iron oxide catalysts in a microautoclave reactor having 20 cc volume. The results for each catalyst are provided in Table 2. The feeds were 2 g Black Thunder Mine sub-bituminous coal and 6.0 g coal-derived solvent +0.2 g DMDS with 0.5 wt. % Fe additive in the catalyst, and the reaction conditions were 427° C. temperature and 14 MPa $H_2$ pressure for 30 minute reaction time. From the Table 2 results, it is seen that the Methods I and II catalysts used in either a wet cake form or a dried particulate form provided hydroconversion results superior to those obtained by the two known iron oxide catalysts. Specifically, the percent coal conversion based on tetrahydrofuran (THF) solubility and percent conversion of 524° C.+ resid fraction were both significantly higher than for the commercial iron oxide catalysts.

TABLE 2

Catalyst Hydroconversion Activity Comparisons

| Catalyst Material | Coal Conversion by THF Solubility, wt % | 524° C. + Resid Conversion, wt % |
|---|---|---|
| Aldrich $Fe_2O_3$ | 76.1 | 34.0 |
| Mach-I $Fe_2O_3$ | 80.6 | 42.8 |
| FeOOH/$SO_4$ (wet cake)*: Method I | 84.5 | 54.0 |
| FeOOH/$SO_4$ (Dry): Method I | 83.3 | 53.3 |

TABLE 2-continued

Catalyst Hydroconversion Activity Comparisons

| Catalyst Material | Coal Conversion by THF Solubility, wt % | 524° C. + Resid Conversion, wt % |
|---|---|---|
| Mo/FeOOH/SO$_4$ (Dry): Method I | 86.8 | 59.6 |
| FeOOH/SO$_4$ (wet cake)* Method II | 86.2 | 55.1 |

*Wet cake catalyst contained about 30 wt. % solids and 70 wt. % moisture.

EXAMPLE 2

Dispersed catalysts prepared by Method II using ferric sulfate pentahydrate starting material were either iron only or iron-molybdenum slurry catalysts, and are based on the idea that a gel or wet-cake form of the catalyst can be used with certain advantages in both performance and cost as compared to a dried particulate form of the catalyst. The Method II ferric (III) sulfate, Fe$_2$(SO$_4$)$_3$ 5H$_2$O is a less expensive starting material and has over 1 gm/cc solubility in de-ionized water. The final catalyst obtained from this Method II preparation is an improved and preferred version of the Method I dry catalyst for providing improved specific economic benefits, which include the following:

Method II catalyst uses a ferric sulfate as starting material instead of ferric alum, and is a much cheaper raw material.

Method II catalyst preparation procedure is more rapid, starting with even more concentrated solutions which need lesser amounts of NH$_4$OH for precipitation of the fine particulate solids.

Method II catalyst is produced in a wet gel form during a rapid precipitation step, and contains SO$_4^{2-}$, NH$_4^+$, FeOOH and Fe(OH)$_3$. The gel contains about 50–80 wt. % water and can be used as a precursor of iron or iron-molybdenum combined catalysts for hydroconversion processes.

Activity testing of the Method II catalyst in a 20 cc volume microautoclave reactor was performed using 2.0 g Black Thunder sub-bituminius coal feed mixed with 6.0 g coal-derived solvent. The catalyst were used in the amounts such that 0.5 wt % Fe and 50 ppm Mo relative were provided to feed coal. Reaction conditions were 427° C. temperature and H$_2$ partial pressure of about 14 MPa for 60 minutes duration was performed. The comparison results are provided in Table 3.

TABLE 3

Dispersed Catalyst Activity Comparisons

| Catalysts | Coal Conversion by THF Solubility, wt. % | 524° C. + Residuum Conversion, wt. % |
|---|---|---|
| Method II FeOOH/SO$_4$ Gel | 87.5 | 58.8 |
| Method II Mo/FeOOH/SO$_4$ Gel | 90.1 | 62.9 |
| Method I FeOOH/SO$_4$ Wet Cake | 86.6 | 59.1 |
| Method I Mo/FeOOH/SO$_4$ Dry Powder | 89.9 | 63.3 |

By comparing the coal conversion and the 524° C.+ residuum conversion results for the dispersed catalyst prepared by Method II vs. that prepared by Method I, it is noted that the results for coal conversion to THF soluble material and 524° C.+ residuum conversion are equivalent or slightly better for the Method II catalysts as compared to the Method I catalysts.

EXAMPLE 3

The dispersed iron oxide catalysts of this invention have been used extensively in continuous bench-scale two-stage operations with throughputs up to 30 kg/day of moisture and ash-free (maf) coal feed for direct catalytic two-stage liquefaction of coal. As shown in Table 4, under the prevailing operating conditions, for the direct liquefaction of a sub-bituminous Wyoming Black Thunder Mine coal, dispersed catalyst containing 615–10000 ppmw of iron and 50–200 ppmw of molybdnenum was used, relative to maf coal feed, in the form of the dispersed iron oxide catalysts of this invention. The dispersed catalysts were used either in an all-dispersed slurry catalyst mode (FIG. 1), or in a hybrid system utilizing dispersed catalyst in one of two close-coupled hydroconversion reactors and the extrudate supported catalyst in the other reactor (FIG. 2).

As shown in Table 4, the use of iron and molybdenum containing dispersed catalysts of this invention has resulted in a coal conversion range of 93–96 wt %, a 524° C.+ residuum conversion range of 83–92 wt %, and C$_4$-524° C. distillate liquid yields of 60–66 wt % (all on maf coal basis). When evaluated on the basis of the maf coal feed, this performance provides up to 4 barrels of C$_4$-524° C. distillate liquid products per ton of the maf coal feed. It is anticipated that use of the dispersed catalysts of this invention would also lower the overall cost associated with a direct coal liquefaction plant and thus make synthetic transportation fuels derived from coal more competitive with those derived from petroleum. This performance result is comparable to or slightly better than that achieved using the conventional extrudate supported hydroprocessing catalysts such as NiMo or CoMo on Al$_2$O$_3$ support in both the hydroconversion reactors (as discussed below in Example 5).

Figure 3:
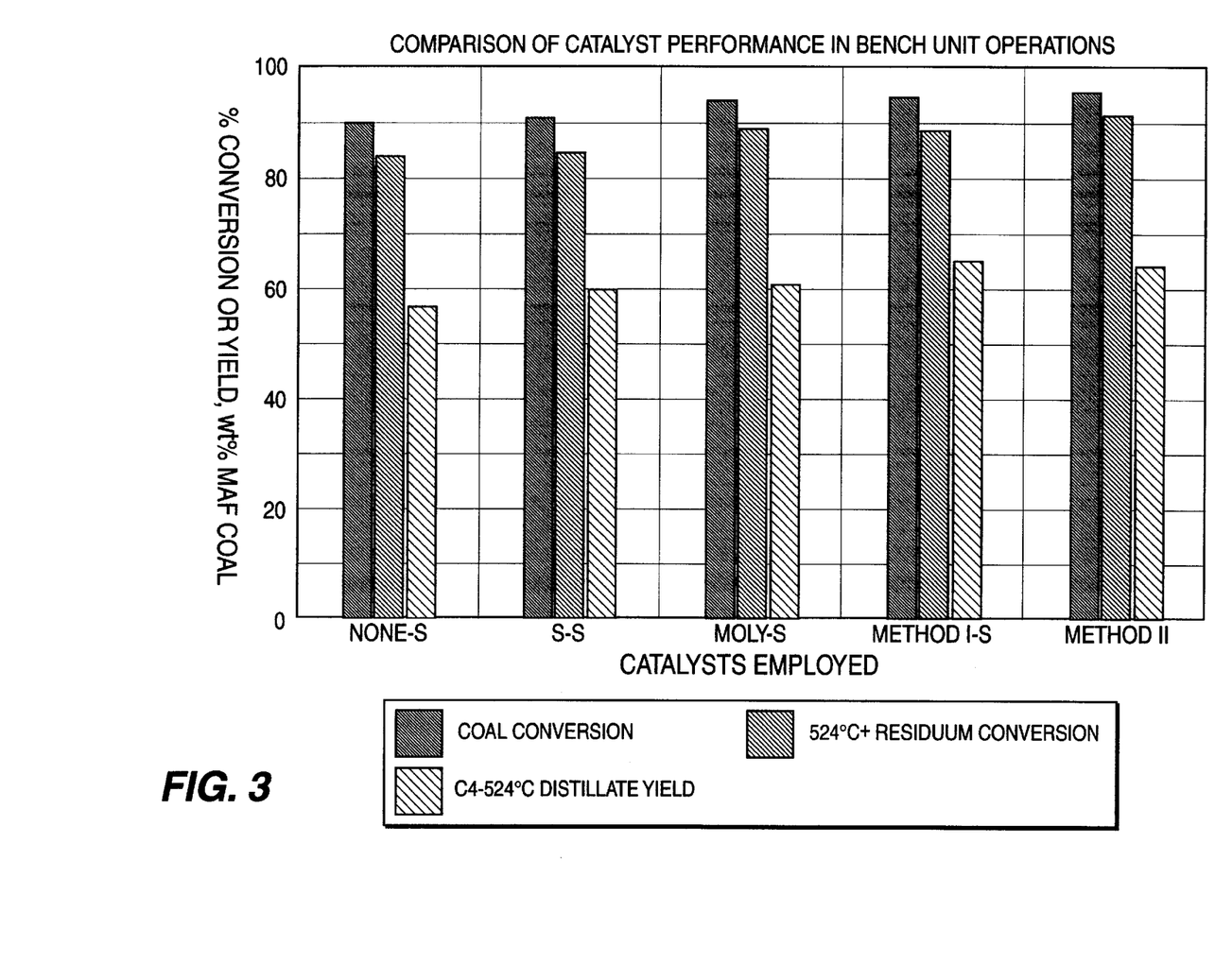
FIG. 3 is a chart showing the comparison of process performance utilizing different dispersed catalysts in bench-scale continuous operations on coal feed.

The performance of dispersed slurry catalysts of this invention has been compared with some other dispersed and supported type catalysts for direct coal liquefaction as shown in FIG. 3. The process performance has been compared on the basis of total coal conversion (based on quinoline solubility of the products), 524° C.+ residuum conversion, and C$_4$-524° C. distillate yield. The first bar (None-S) in FIG. 3 represents process performance with a thermal first stage reactor and an expanded supported catalyst bed in the second stage reactor; the second bar (S—S) represents process performance with supported catalysts in both the reactor stages; the third bar (Moly-S) represents molybdenum dispersed catalyst in first stage reactor and an expanded supported catalyst bed in the second stage reactor; the fourth bar (Method I-S) represents performance with dispersed catalyst made by the Method I of this invention in the first stage reactor and an expanded supported catalyst in the second stage reactor (a 'hybrid' catalyst two-stage reactor configuration, as shown in FIG. 2); the fifth bar (Method II) represents the performance of an all-dispersed slurry catalyst two-stage reactor system (FIG. 1) utilizing the dispersed catalyst made by the Method II of this invention. It can be clearly seen from FIG. 3 that the reactor configurations utilizing dispersed catalysts of this invention result in the highest extents of total coal and 524° C.+ residuum conversion, and C$_4$-524° C. distillate yields.

TABLE 4

Hydroliquefaction of Coal using Dispersed and Supported Catalysts

| Run ID | CMSL-6 | CMSL-6 | CMSL-9 | CMSL-10 | CMSL-11 | PB-01 | PB-02 |
|---|---|---|---|---|---|---|---|
| Unit 227 Run | 83 | 83 | 87 | 88 | 89 | 90 | 91 |
| Condition | 1B | 4 | 6 | 2 | 1 | 1 | 1B |
| Period Number | 5–6 | 16–17 | 29 | 9 | 5 | 5 | 7 |
| Supported Cat Stage (all NiMo) | 2 | 2 | none | none | none | none | 2 |
| Cat Age, kg dry coal/kg cat | 500+ | 500+ | n/a | n/a | n/a | n/a | 414 |
| Dispersed Cat. Conc., ppm | | | | | | | |
| Fe | 1230 | 615 | 10000 | 5000 | 5000 | 5000 | 5000 |
| Mo | 200 | 100 | 100 | 100 | 50 | 50 | 50 |
| Recycle/Coal Ratio | 1.2 | 1.3 | 1 | 1 | 1 | 1 | |
| Space Velocity, kg feed/hr/m$^3$ | 480 | 640 | 666 | 414 | 703 | 694 | 665 |
| Temperatures °C. | | | | | | | |
| First Stage | 427 | 449 | 440 | 441 | 441 | 433 | 447 |
| Second Stage | 413 | 429 | 449 | 448 | 449 | 449 | 427 |
| Pressure, Mpa | 17.2 | 17.3 | 17.2 | 17.2 | 17.3 | 17.3 | 17.2 |
| Material Balance (%) (gross) | 98.47 | 98.36 | 103.8 | 103.5 | 96.65 | 98.97 | 97.2 |
| Estimated Normalized Yields, W % MAF Feed | | | | | | | |
| C1–C3 in Gases | 8.3 | 11.3 | 9.2 | 15.7 | 14.8 | 12.4 | 10.3 |
| C4–177° C. in Liquids | 15.9 | 18.2 | 12.1 | 21.4 | 19.7 | 21.2 | 20.8 |
| 177–343° C. in Liquids | 26.4 | 33.5 | 30.6 | 27.5 | 32.1 | 28.0 | 26.4 |
| 343–524° C. in Liquids | 20.1 | 14.9 | 16.5 | 11.1 | 9.0 | 12.7 | 16.2 |
| 524° C.+ | 11.2 | 4.5 | 7.4 | 4.0 | 3.7 | 6.6 | 5.4 |
| Water, COx, H2S, NH3 | 18.7 | 19.4 | 20.1 | 16.7 | 17.2 | 19.8 | 21.0 |
| Total (100 + H$_2$ reacted) | 107.1 | 107.0 | 105.8 | 107.5 | 106.5 | 106.4 | 107.3 |
| Process Performance, W % MAF Feed | | | | | | | |
| Feed Conversion | 94.1 | 94.5 | 96.1 | 94.3 | 95.5 | 94.7 | 92.8 |
| 524° C. + Conversion | 82.9 | 90.0 | 87.6 | 90.1 | 91.5 | 88.0 | 87.4 |
| C4–524° C. Distillate Yield | 63.2 | 66.3 | 62.6 | 63.6 | 64.6 | 61.8 | 63.4 |

EXAMPLE 4

Bench-scale continuous two-stage operations were also conducted to evaluate the performance of the dispersed iron oxide catalysts of this invention for hydroconversion of (a) heavy petroleum oil (California Hondo resid vacuum tower bottoms), (b) mixtures of heavy petroleum resid oil and mixed plastics (containing high density polyethylene, polypropylene, polystyrene, and other organic/inorganic impurities) from municipal solid waste streams, (c) mixtures of Wyoming Black Thunder Mine coal and Hondo resid, and (d) combinations of coal, Hondo resid, and the mixed plastics feeds. Significant process performance was obtained with all of these varied feedstocks with dispersed catalysts in each stage reactor, under conditions similar to those employed for direct coal liquefaction. The prevailing operating conditions, feed type and composition, dispersed catalyst metal loadings, and process performance and yields are summarized in Table 5.

Figure 4:
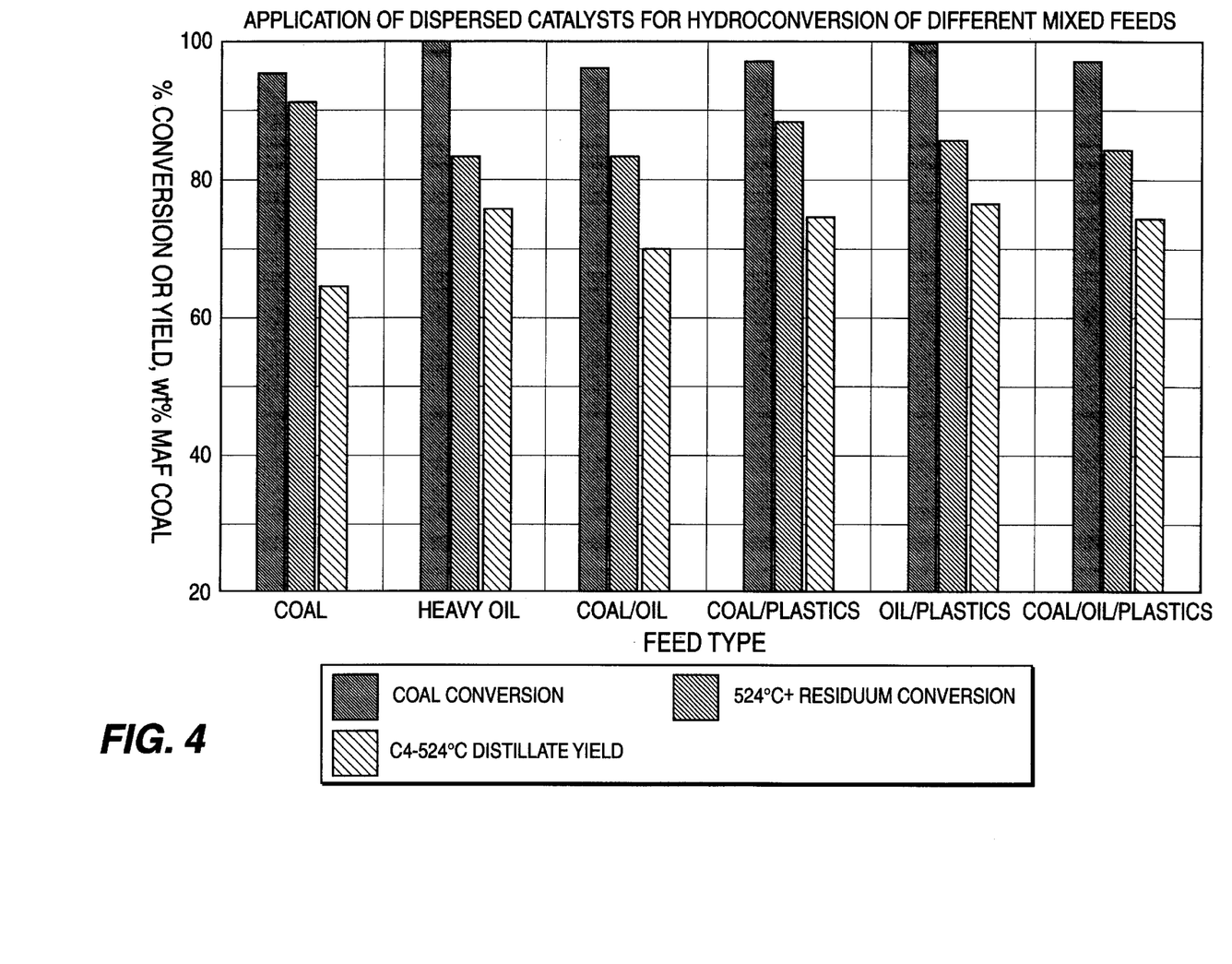
FIG. 4 is a chart showing the process performance during the bench-scale hydroprocessing of different types of feeds using the dispersed slurry catalysts of this invention.

As shown in Table 5, consistently high feed conversions and light distillate oil yields have been realized in the bench-scale operations. With the bench-scale operations involving either heavy petroleum resid, Hondo resid alone or in a mixed feed with coal, as high as 99 wt % feed conversion to quinoline soluble products was obtained, with as high as 75 wt % C$_4$-524° C. distillate liquid yields. During the operations, involving mixed plastics from a municipal solid waste stream, either with coal or with heavy resid or mixtures of coal and heavy resid, over 93 wt % total feed conversions were realized with about 75 wt % distillate liquid yields. During the individual bench-scale operations such as runs CMSL-6, CMSL-10, and CMSL-11 and others, as shown in both Tables 4 and 5, the overall process performance has been maintained at a uniform high level with increased time on stream, which is very important from the consideration of catalyst-usage or consumption during the reaction. Typically, with the conventional supported extrudate catalysts, significant catalyst deactivation occurs with time on-stream resulting in the degradation of the overall process performance during a continuous process. This catalyst deactivation pattern resulting in deteriorating process performance is significantly absent when dispersed slurry catalysts of this invention are used in place of the supported extrudate catalysts. The process performace, in terms of total feed hydroconversion, 524° C.+ residuum conversion, C$_4$-524° C. distillate yield, is shown in FIG. 4 with the dispersed slurry catalysts of this invention and different types of carbonaceous feed materials.

EXAMPLE 5

The dispersed iron oxide catalysts of this invention have been compared in Table 6 with the conventional supported extrudate catalysts and other types of dispersed catalysts for their activity and process performance in direct hydroliquefaction of coal. As shown in Table 6, the dispersed catalysts of this invention, employed during the continuous bench-scale operations CMSL-06, CMSL-10, CMSL-11, and PB-01, have consistently resulted in higher levels of coal conversion, 524° C.+ residuum conversion, and C$_4$-524° C. distillate yields than that for either NiMo/Al$_2$O$_3$ supported catalysts in both hydroconversion reactors, or combinations of dispersed slurry catalyst in a first stage reactor and supported extrudate catalysts in a second stage reactor (hybrid) configurations. Under comparable reaction severities, as much as 8 wt % higher coal conversion, 6 wt % higher distillate yield, and 8 wt % higher residuum conversions have been obtained using an all dispersed slurry catalyst in hydroconversion reactors system during the CMSL-11 bench operations, as compared with the CC-1 bench operations which utilized supported extrudate catalysts in both reactors. The continuous bench operations CC-15 and CMSL-01 employed hybrid mode of catalyst operations with an iron oxide dispersed catalyst precipitated on the surface of the feed Wyoming Black Thunder Mine subbituminous coal. Comparison of process performance of these continuous operations with that from CMSL-06, CMSL-10, and CMSL-11 operations, under similar operating thermal severity, and with similar dispersed catalyst metal loadings, indicates a much improved performance in the latter continuous operations which had employed the dispersed slurry catalysts of this invention.

TABLE 5

Hydroprocessing Runs Utilizing Dispersed Catalyst on Mixed Feeds

| Run ID | CMSL-09 | CMSL-11 | CMSL-11 | PB-01 | PB-01 | PB-01 | PB-01 |
|---|---|---|---|---|---|---|---|
| Unit 227 Run | 87 | 89 | 89 | 90 | 90 | 90 | 90 |
| Condition | 9 | 3A | 4B | 4 | 5 | 7 | 9 |
| Period Number | 41 | 16 | 17 | 19 | 25 | 34 | 41 |
| Dispersed Cat. Conc., ppm | | | | | | | |
| Fe | 10000 | 5000 | 5000 | 5000 | 5000 | 5000 | 5000 |
| Fresh Mo + Recovered Mo | 300 | 100 | 100 | 50 | 50 | 50 | 50 |
| Feed Composition, W % | | | | | | | |
| Coal | 50 | 67 | 75 | 0 | 50 | 33.33 | 0 |
| Waste Plastics | 50 | 33 | 25 | 0 | 0 | 33.33 | 50 |
| Hondo Resid | 0 | 0 | 0 | 100 | 50 | 33.33 | 50 |
| Oil/Solids Ratio | 1.5 | 1.5 | 1.5 | 0.17 | 0.17 | 0.17 | 0.17 |
| Space Velocity, kg feed/hr/m$^3$ | 669 | 687 | 662 | 1059 | 870 | 1033 | 1250 |
| Temperatures, °C. | | | | | | | |
| First Stage | 449 | 450 | 447 | 441 | 442 | 450 | 451 |
| Second Stage | 462 | 459 | 461 | 451 | 450 | 461 | 460 |
| Pressure, MPa | 17.2 | 17.2 | 17.2 | 17.2 | 17.2 | 17.2 | 17.2 |
| Material Balance (%) (gross) | 102.1 | 99.37 | 95.63 | 100.06 | 97.87 | 96.46 | 94.15 |
| Estimated Normalized Yields, W % MAF Feed | | | | | | | |
| C1–C3 in Gases | 7.3 | 8.3 | 7.1 | 5.0 | 7.4 | 7.6 | 4.3 |
| C4–177° C. in Liquids | 29.1 | 16.2 | 12.8 | 16.2 | 19.8 | 26.2 | 21.4 |
| 177–343° C. in Liquids | 25.4 | 23.9 | 25.0 | 27.7 | 27.1 | 24.6 | 24.3 |
| 343–524° C. in Liquids | 17.6 | 24.3 | 26.9 | 32.2 | 22.8 | 22.0 | 30.5 |
| 524° C.+ | 8.6 | 11.0 | 10.7 | 16.5 | 13.5 | 10.9 | 15.7 |
| Water, COx, NH3, H2S | 9.6 | 11.8 | 12.9 | 4.1 | 9.8 | 8.4 | 4.9 |
| Total (100 + H$_2$ reacted) | 103.4 | 103.9 | 104.7 | 101.7 | 104.2 | 103.4 | 101.8 |
| Process Performance, W % MAF Feed | | | | | | | |
| Feed Conversion | 97.0 | 95.3 | 94.7 | 99.9 | 96.1 | 96.3 | 99.7 |
| 524° C. + Conversion | 88.1 | 83.9 | 83.5 | 83.3 | 82.7 | 85.4 | 84.0 |
| C4–524° C. Distillate Yield | 74.3 | 67.0 | 67.6 | 76.0 | 69.7 | 72.8 | 76.2 |

TABLE 6

Process Performance Comparisons using Dispersed and Supported Catalysts

| Run ID | CC-1 | CC-15 | CC-15 | CMSL-01 | CMSL-01 | CMSL-10 | CMSL-11 | PB-01 |
|---|---|---|---|---|---|---|---|---|
| Supported Catalyst | | | | | | | | |
| First Stage | S-317 | none | none | none | none | none | none | none |
| Second Stage | S-317 | S-317 | S-317 | S-317 | S-317 | none | none | none |
| Second Stage Cat Age, kg dry coal/kg cat | 660 | 316 | 403 | 284 | 530 | n/a | n/a | n/a |
| Dispersed Cat. Conc., ppm | | | | | | | | |
| Fe | none | none | 6600 | 6600 | none | 5000 | 5000 | 5000 |
| Fresh Mo/Recovered Mo | none | none | none | 300 | 300 | 100 | 50 | 50 |
| Space Velocity, kg feed/hr/m$^3$ | 498 | 333 | 324 | 546 | 477 | 414 | 703 | 876 |
| Temperatures, °C. | | | | | | | | |
| First Stage | 400 | 427 | 427 | 439 | 440 | 441 | 441 | 441 |
| Second Stage | 441 | 413 | 412 | 413 | 413 | 448 | 449 | 450 |
| Pressure, Mpa | 17.2 | 17.2 | 17.2 | 17.3 | 17.2 | 17.2 | 17.2 | 17.2 |
| Process Performance, W % MAF Feed | | | | | | | | |
| Coal Conversion | | | | | | | | |
| First Stage | — | 87 | 90.7 | 90.5 | 91.1 | — | | |
| Second Stage | 87.3 | 90 | 92.4 | 93.4 | 93.9 | 94.3 | 95.5 | 92.8 |
| C1–C3 in Gases | 8.16 | 10.54 | 10.49 | 9.93 | 11.1 | 15.71 | 14.76 | 9.01 |
| C4–524° C. Distillate Yield | 59.8 | 57.4 | 60.5 | 63.5 | 60.7 | 63.6 | 64.6 | 62.0 |

TABLE 6-continued

Process Performance Comparisons using Dispersed and Supported Catalysts

| Run ID | CC-1 | CC-15 | CC-15 | CMSL-01 | CMSL-01 | CMSL-10 | CMSL-11 | PB-01 |
|---|---|---|---|---|---|---|---|---|
| 524° C. + Conversion | 82.7 | 84 | 85.4 | 90.5 | 89.1 | 90.1 | 91.5 | 82.6 |
| Hydrogen Consumption, W % MAF Feed | 7.09 | 8.29 | 8.34 | 8.57 | 8.98 | 7.42 | 6.53 | 5.44 |

Although this invention has been described broadly and also in terms of preferred embodiments, it will be understood that modifications and variations can be made to the catalyst composition and method of preparation all within the scope of the invention which is defined by the following claims.

We claim:

1. A dispersed fine-sized catalyst composed of oxides and/or oxyhydroxides of iron precipitates formed in presence of 0.5–10 wt. % anions of molybdate ($MoO_4^{2-}$), phosphate ($PO_4^{2-}$), sulfate ($SO_4^{2-}$), or tungstate ($WO_4^{2-}$); said precipitates containing 5–60 wt % iron and being promoted with addition of 0.05–2.0 wt. % of at least one active promotor metal selected from the group consisting of cobalt, molybdenum, nickel, tungsten and combinations thereof, with the remainder being water, said catalyst after drying having primary particle size smaller than about 50 Angstrom units and a secondary particle size of 1–20 microns.

2. The catalyst material of claim 1, wherein said precipitate particles before drying contain 10–50 wt. % iron, 1–5 wt. % sulfate ($SO_4$) anion, and 0.1–1.0 wt % of said active promotor metal, with the remainder being the water.

3. The catalyst material of claim 1, wherein the precipitate particles are provided in the form of a gel containing 50–70 wt % water.

4. The catalyst material of claim 1, wherein the precipitates are in the form of dried fine-sized particles having surface area of 100–250 $m^2/g$.

5. A dispersed fine-sized catalyst material composed of oxides and/or oxyhydroxides of iron in a gel form, said catalyst including precipitates formed in the presence of 0.5–2.0 wt. % sulfate ($SO_4$) anions, said precipitate particles containing 10–20 wt. % iron, 0.05–0.5 wt. % molybdenum, with the remainder being water, said precipitates having a primary particle size smaller than about 40 Angstrom units.

6. A method for making a dispersed fine-sized catalyst prepared by rapid aqueous precipitation from salt solutions containing iron, a source of an anion, and a promoter metal, the method comprising the steps of:

(a) dissolving an iron salt in an aqueous solution containing anions of molybdate, phosphate, sulfate or tungstate, and a promoter metal salt containing a metal selected from the group consisting of cobalt, molybdenum, nickel, and tungsten with solubility exceeding about 60 g of said salt per 100 cc aqueous solution at 20°–30° C. temperature; and (b) adding ammonium hydroxide to said aqueous solution at a rate of 10–20 cc/min to form precipitates at a final pH of 4–8.5.

7. The catalyst making method of claim 6, wherein the iron salt starting material is ferric ammonium sulfate, the promoter metal salt is ammonium molybdate, and ammonium hydroxide 28 wt. % solution is added in amounts sufficient to provide a pH of 4.0–5.5 and to produce the precipitates in a gel form.

8. The catalyst making method of claim 7, including filtering and drying the precipitates at 100°–120° C. temperature to produce primary particulate solids smaller than 50 Angstroms and having surface area of 100–250 $m^2/g$.

9. The catalyst making method of claim 6, wherein the iron salt starting material is ferric sulfate pentahydrate, $Fe_2(SO_4)_3 \cdot 5H_2O$, the promoter metal salt is ammonium molybdate and sufficient amount of 28 wt. % ammonium hydroxide is added to provide a pH of 4.0–5.5 and produce the precipitates in gel form.

10. The catalyst making method of claim 9, including adding the ammonium hydroxide in sufficient amount to produce a pH of 7.5–8.5, and then filtering and drying said aqueous solution at 100°–120° C. temperature to produce particles with primary size smaller than 50 Angstroms and having surface area of 100–250 $m^2/g$.

11. A catalytic process for hydroconversion of high molecular weight hydrocarbon feed material to produce lower boiling hydrocarbon liquid products, the process comprising: (a) reacting the feed material with a dispersed catalyst as defined by claim 1 under reaction conditions of 400°–460° C. (750°–860° F.) temperature, 5–20 NPa (735–2950 psig) hydrogen partial pressure, 320–1280 kg/h/$m^3$ reactor (20–80 lb/h/$ft^3$ reactor) space velocity, and catalyst loading of 500–10,000 ppmw iron to produce vapor and liquid fractions; (b) phase separating the vapor and liquid fractions and distilling the liquid fraction, and withdrawing a low-boiling hydrocarbon liquid product.

12. A catalytic hydroconversion process according to claim 11, wherein the hydrocarbon feed material is coal and the reaction conditions are 425°–450° C. temperature, 7–17 MPa hydrogen partial pressure, and space velocity of 320–800 kg/h/$m^3$ reactor volume.

13. A catalytic hydroconversion process according to claim 11, wherein the hydrocarbon feed material is heavy petroleum resid.

14. A catalytic hydroconversion process according to claim 11, wherein the feed material is a mixture of coal and heavy petroleum resid.

15. A catalytic hydroconversion process according to claim 11, wherein the feed material is waste co-mingled plastics including a mixture of polyethylene, polystyrene, and polypropylene.

16. A catalytic hydroconversion process according to claim 11, wherein the feed material is a mixture of waste co-mingled plastics and heavy petroleum resid.

17. A catalytic hydroconversion process according to claim 11, wherein the feed material is a mixture of coal, waste co-mingled plastics, and heavy petroleum resid.

18. A catalytic hydroconversion process according to claim 11, wherein the feed material is reacted in two-stage close-coupled reactors connected in series.

19. A catalytic hydroconversion process according to claim 11, wherein the feed material is reacted in two-stage reactors connected in series with a gas-liquid separation step located in between the reactors.

* * * * *